US008893124B2

(12) United States Patent
Bork et al.

(10) Patent No.: US 8,893,124 B2
(45) Date of Patent: Nov. 18, 2014

(54) METHOD, APPARATUS AND SYSTEM FOR LIMITING ACCESS TO VIRTUALIZATION INFORMATION IN A MEMORY

(75) Inventors: Jon E. Bork, Windsor, CO (US); Scott T. Durrant, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 13/077,877

(22) Filed: Mar. 31, 2011

(65) Prior Publication Data
US 2012/0254864 A1  Oct. 4, 2012

(51) Int. Cl.
*G06F 9/455* (2006.01)
*G06F 9/50* (2006.01)
*G06F 21/00* (2013.01)

(52) U.S. Cl.
CPC .. *G06F 9/45558* (2013.01); *G06F 2009/45583* (2013.01)
USPC .................. 718/1; 718/104; 711/6; 711/166; 726/26

(58) Field of Classification Search
None
See application file for complete search history.

(56) References Cited

U.S. PATENT DOCUMENTS 7,124,327 B2   10/2006   Bennett et al.
7,370,324 B2    5/2008   Goud et al.
7,401,230 B2 *  7/2008   Campbell et al. ............. 713/190

OTHER PUBLICATIONS

Krautheim, F. John. "Private virtual infrastructure for cloud computing." Proceedings of the 2009 conference on Hot topics in cloud computing. USENIX Association, 2009.*
"CSA, Cloud Security Alliance. Security Guidance for Critical Areas of Focus in Cloud Computing V2.1, Cloud Security Alliance, Dec. 2009", 76 pages.

* cited by examiner

*Primary Examiner* — Qing Wu
(74) *Attorney, Agent, or Firm* — Blakely, Sokoloff, Taylor & Zafman LLP

(57) ABSTRACT

Techniques for limiting access to virtualization information which is stored in a memory region allocated to a virtual machine instance. In an embodiment, virtualization information is written over in response to an indication of a close event which is to change an allocation of the memory region to the virtual machine instance. In another embodiment, the virtualization information is written over before the memory region is made available for a subsequent allocation.

18 Claims, 6 Drawing Sheets

METHOD, APPARATUS AND SYSTEM FOR LIMITING ACCESS TO VIRTUALIZATION INFORMATION IN A MEMORY

BACKGROUND

1. Technical Field

Embodiments generally relate to security mechanisms for computer virtualization. More particularly, certain embodiments provide techniques for limiting access to information which is to be used in performing an operation of a virtual machine.

2. Background Art

In conventional computer virtualization schemes, a virtual-machine monitor (VMM) typically runs on a computer and presents to other software the abstraction of one or more virtual machines. Each virtual machine (VM) may run its own "guest operating system" (i.e., an operating system hosted by the VMM). The guest operating system expects to operate as if it were running on a dedicated computer rather than a virtual machine. That is, the guest operating system expects to control various computer operations and have access to hardware resources during these operations.

As integrated circuit (IC) fabrication technologies continue to improve, increasing processing power is being introduced to smaller and more varied types of computer platforms. As a result, increasingly varied and robust types of virtualization are being introduced on these new platforms.

Moreover, as computer networking and other associated technologies continue to improve, increasingly varied and robust types of collaborative computing are also being introduced on such platforms. For example, increasingly sophisticated cloud computing, cluster computing, distributed computing (e.g. grid computing) and other such techniques are being introduced on more powerful servers, desktops, laptops, and even handheld devices such as tablets, smart phones and the like.

Typically, such collaborative computing includes a computer platform making some local resource available over a network for use by a remote computer platform. As the extent and variety of such resource sharing grows on an increasing variety of computer platforms, the variety and potential of associated security risks (e.g. from viruses or other malware) also grows. These increasingly varied and potent risks pose particular challenges when it comes to the goal of assuring that virtualization is implemented securely.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
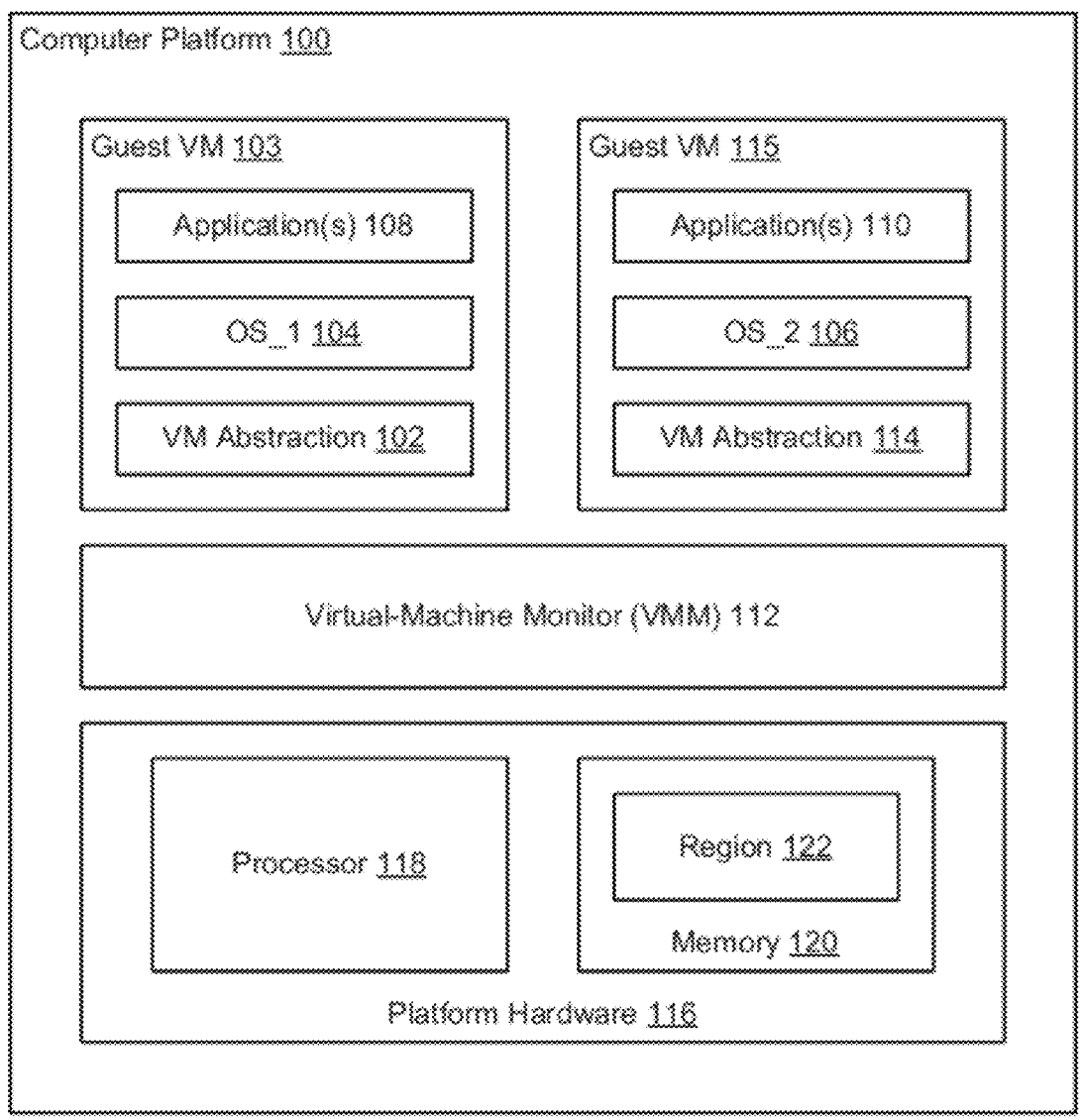
FIG. 1 is a block diagram illustrating select elements of a computer platform to provide security for virtualization information according to an embodiment.

Embodiments discussed herein variously relate to certain situations in which an instance of a virtual machine (also referred to herein as a "VM instance" or simply "VM") which has resided on a given computer platform, is ended—or is to be ended—at least on that computer platform. For example, a VM instance may be terminated altogether, or scheduled to be so terminated. Alternatively, the VM instance may be migrated, or scheduled for migration, from the computer platform for subsequent execution of that VM instance on another computer platform.

During residence of a VM instance on a particular computer platform (prior to the VM instance being ended on that computer platform) a region of that computer platform's system memory (referred to herein as a "memory region")—e.g. including contiguous and/or non-contiguous memory locations thereof—may be allocated for use by that VM instance. In an embodiment, such allocation of a memory region may have been previously implemented with a VMM which manages the VM instance—e.g. where the VMM maintains or otherwise has access to a repository to store configuration information which defines or otherwise describes such allocation. Such configuration information may, for example, be maintained in a repository such as those provided by Rapid Virtualization Indexing (RVI) in AMD Opteron™ and later processors of AMD, Incorporated of Sunnyvale, Calif., and/or provided by Extended Page Tables (EPT) in various processors (e.g. Intel® Core™ i7, Intel® Core™ i5, Intel® Core™ i3, etc.) of Intel Corporation of Santa Clara, Calif. It is understood that, in various embodiments, any of a variety of additional or alternative repositories may be used to store such configuration information identifying an allocation of a memory region to a VM instance.

Certain virtualization information may be stored in the memory region allocated for use by the VM instance. As used herein, "virtualization information" refers to any data in memory that defines or describes a VM instance, the state of a VM instance, or any information created, managed, or used by a VM instance or any applications or processes running within that VM instance. By way of illustration and not limitation, configuration information which defines a current state of the VM instance, application data to be used by an application running within the VM instance, security information (e.g. an authentication credential and/or an authorization credential) with which the VM instance accesses a resource, etc. Alternatively or in addition, such virtualization information may include one or more instructions which are to be executed as part of an operation of the VM instance. In an embodiment, such virtualization information may include data which is to be exchanged by direct memory access (DMA) on behalf of the VM instance. It is understood that any of a variety of additional or alternative types of data may be stored in the allocated memory region for use in a process of the VM instance.

Ending a VM instance on a computer platform may include a closing event which changes allocation of one or more memory regions to the VM instance. For example, a closing event may include an agent (e.g. a VMM or host OS) updating configuration information which, prior to the closing event, had identified that some particular memory region is allocated for use by that VM instance. The updating of such configuration information may be to store updated information identifying that the memory region is no longer allocated to any particular VM instance. Such updating may result in the memory region being made available for subsequent allocation to some other use—e.g. for use by some other VM instance executing, or to be executed, on the computer platform. Alternatively, the updating of such configuration information may be to store updated information identifying that the memory region is instead allocated to some other VM instance.

In certain embodiments, any of a variety of different agents other than, or in addition to, a VMM may initiate a closing event for ending a VM instance on a computer platform. By way of illustration and not limitation, an operating system on which the VMM runs may independently initiate a closing event—e.g. in response to a system failure event which requires the computer platform to suspend, shut down, reboot and/or the like. Alternatively or in addition, a closing event may be triggered by the system management mode (SMM) of a host processor, a dedicated security processor, a policy engine, a management tool, and/or the like. Alternatively or in addition, the ending of a VM instance may be initiated by any of a variety of manual shut-down commands by an administrator or other user.

In existing technologies, when a VM instance is ended on a computer platform, a region of memory previously used for processes of that VM instance is simply handed back either to the host operating system of the platform or to the VMM—without particular concern for the security of data which remains in this handed-off memory. However, the growing potential of new hacks and malware has increased the security exposure of even data in such handed-off memory. This is particularly the case where virtualization is being used in various types of collaborative (e.g. cloud, distributed, grid, cluster, etc.) computing. In such cases, where an entity external to a computer platform may access a shared resource of the computer platform, malicious entities could conceivably request and/or be granted access to that de-allocated memory region to look for data which might be of interest (e.g. commercial interest, security interest, etc.).

Certain embodiments provide various techniques for logic (e.g. hardware, executing software and/or firmware) which limits such access to virtualization information. For example, circuit logic may be included in, or operate with, logic for implementing or otherwise supporting a storage (such as RVI or EPT)—referred to herein as a memory allocation repository—for configuration information describing an allocation of a memory region to a VM instance.

In an embodiment, the logic may include logic to receive a message indicating a close event for an instance of a VM on a computer platform. A region of system memory of the computer platform may be allocated for use by the VM instance. In response to the received message, logic may write over virtualization information in the memory region. For example, the virtualization information may be written over prior to any subsequent allocation of the allocated memory region.

In an embodiment, the writing over of the virtualization information may be independent of any message sent from software requesting that virtualization information be written over. For example, the message indicating the close event may indicate that merely an allocation of a memory region is to be changed—i.e. without software more particularly requesting or otherwise specifying that virtualization information stored in that memory region is to be written over.

FIG. 1 illustrates one embodiment of a computer platform 100, in which the present invention may operate. In this embodiment, platform hardware 116 of computing platform 100 may be capable, for example, of executing a standard operating system (OS) and/or a virtual-machine monitor (VMM), such as a VMM 112. The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs and their typical features and functionality are well-known by those skilled in the art and may be implemented, for example, in software, firmware or by a combination of various techniques.

The platform hardware 116 can be of a personal computer (PC), server, mainframe, portable computer, set-top box, handheld device (e.g. smart phone, tablet, etc.), embedded device, smart TV, communication device/router, or any other such computing system. The platform hardware 116 includes a processor 118, memory 120 and possibly other platform hardware (e.g. input-output devices), not shown.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. In an embodiment, processor 118 may include one or more processor cores, not shown.

Memory 120 can be a hard disk, a floppy disk, random access memory (RAM), flash memory, any combination of the above devices, or any other type of storage medium which is readable/writable by processor 118. Memory 120 may store instructions or data for performing a process of a VM instance, in certain embodiments.

The VMM 112 may manage one or more guest VM instances, illustrated in FIG. 1 by VM instances 103, 115. It is understood that VMM 112 may manage fewer, more and/or different VM instances, according to various embodiments. To each VM it manages, VMM 112 may present a respective abstraction of a machine—e.g. according to already established virtualization techniques. The VMM 112 may provide the same or different abstractions to the various VM instances. FIG. 1 shows two such VM abstractions 102 and 114, though more or less than two VM abstractions may be supported. Guest software running on each VM may include a guest OS and, optionally, one or more applications running thereon. An illustration of such guest software is represented by guest OS_1 104 and one or more applications 108 of VM instance 103 and by guest OS_2 106 and one or more applications 110 of VM instance 115.

VM instances 103 and 115 may expect to access physical resources (e.g., processor registers, memory and I/O devices) using the respective abstractions 102 and 114 on which their guest software is running. The VMM 112 facilitates access to resources desired by guest software while retaining ultimate control over resources within the platform hardware 116.

A region 122 of memory 120 may be allocated for use by a particular VM instance—e.g. VM instance 103. In an embodiment, the allocation of region 122 for use by VM instance 103 may be specified by configuration information in a memory allocation repository (not shown). For example, such a memory allocation repository may include another region of memory 120. Alternatively or in addition, such a memory allocation repository may include one or more registers within processor 118 and/or within an input/output (I/O) memory management unit (not shown). Such an I/O memory management unit (IOMMU) may, for example, provide for direct exchanges with a peripheral (not shown) of computer platform 100. Alternatively or in addition, the memory allocation repository may include registers of a memory management unit, memory controller hub or other component of a chipset (not shown) of platform hardware 116 which facilitates management of memory 120 for processor 118.

Although certain embodiments are not limited in this regard, the VM instance which has been allocated region 122 may reside on computer platform 100 in order to perform a task of a collaborative computing project. More particularly, processes of guest VM 103 may be on behalf of a cloud computing, distributed computing, etc. agent (not shown) which is external to computer platform 100—e.g. an agent in communication with computer platform 100 over a network. In participating in such collaborative computing, computer platform 100 may expose resources of the VM instance to unauthorized and/or malicious access.

Figure 2:
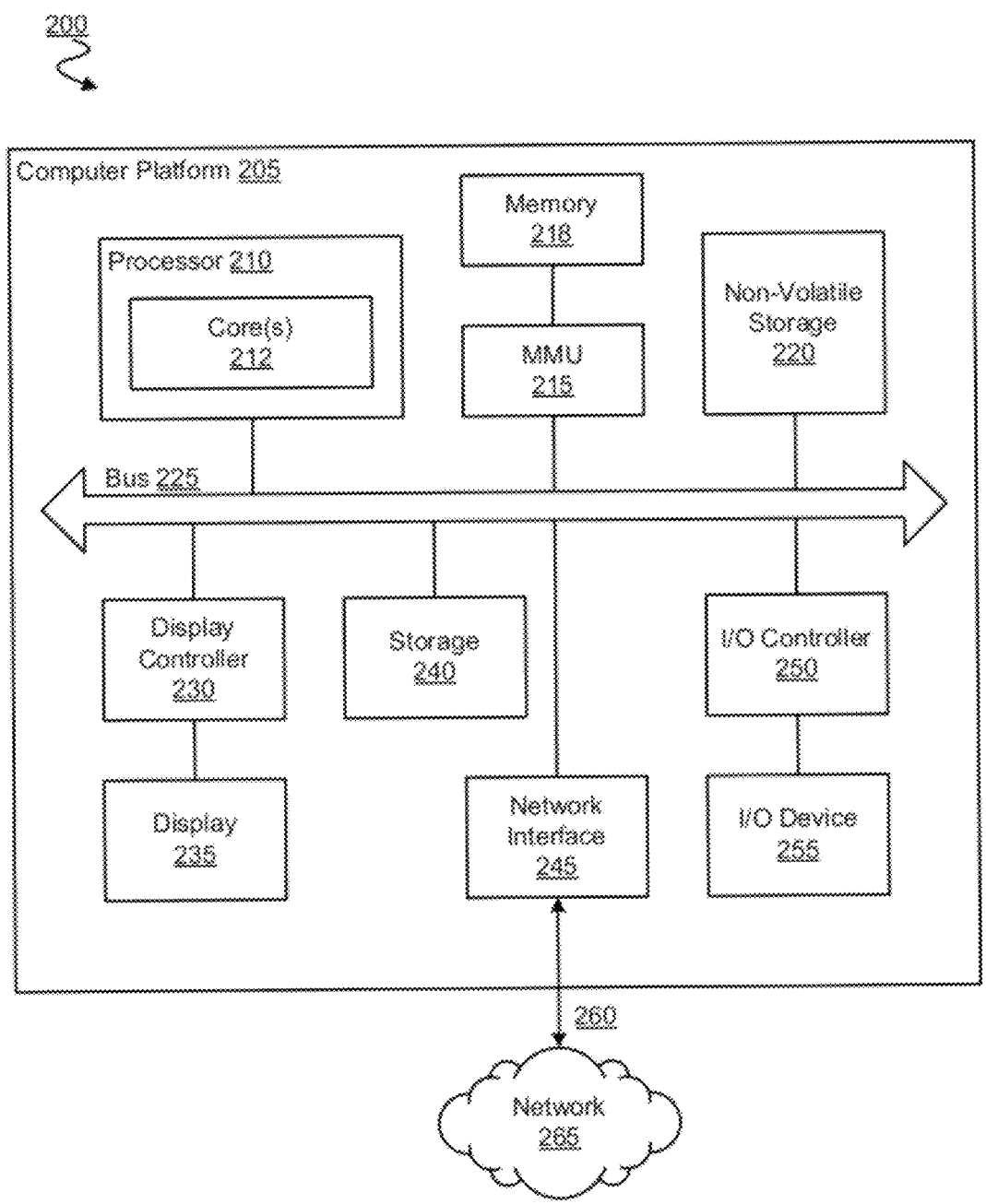
FIG. 2 is a block diagram illustrating select elements of a computer system to provide security for virtualization information according to an embodiment.

FIG. 2 is an illustration of one embodiment of an example computer system 200 in which embodiments of the present invention may be implemented. In one embodiment, computer system 200 includes a computer platform 205 which, for example, may include some or all of the features of computer platform 100. Computer platform 205 may include a processor 210 coupled to a bus 225, the processor 210 having one or more processor cores 212. Memory 218, storage 240, non-volatile storage 220, display controller 230, input/output controller 250 and modem or network interface 245 are also coupled to bus 225. The computer platform 205 may interface to one or more external devices through the network interface 245. This interface 245 may include a modem, Integrated Services Digital Network (ISDN) modem, cable modem, Digital Subscriber Line (DSL) modem, a T-1 line interface, a T-3 line interface, Ethernet interface, WiFi interface, WiMax interface, Bluetooth interface, or any of a variety of other such interfaces for coupling to another computer. In an illustrative example, a network connection 260 may be established for computer platform 205 to receive and/or transmit communications via network interface 245 with a computer network 265 such as, for example, a local area network (LAN), wide area network (WAN), or the Internet. In one embodiment, computer network 265 is further coupled to a remote computer (not shown), such that computer platform 205 and the remote computer can communicate—e.g. in a collaborative computing project.

Processor 210 may include features of a conventional microprocessor including, but not limited to, features of an Intel Corporation x86, Pentium®, or Itanium® processor family microprocessor, a Motorola family microprocessor, or the like. Memory 218 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 230 controls in a conventional manner a display 235, which in one embodiment may be a cathode ray tube (CRT), a liquid crystal display (LCD), an active matrix display or the like. An input/output device 255 coupled to input/output controller 250 may be a keyboard, disk drive, printer, scanner and other input and output devices, including a mouse, trackball, trackpad, joystick, or other pointing device.

The computer platform 205 may also include non-volatile storage 220 on which firmware and/or data may be stored. Non-volatile storage devices include, but are not limited to Read-Only Memory (ROM), Flash memory, Erasable Programmable Read Only Memory (EPROM), Electronically Erasable Programmable Read Only Memory (EEPROM), or the like.

Storage 240, in one embodiment, may be a magnetic hard disk, an optical disk, or another form of storage for large amounts of data. Some data may be written by a direct memory access process into memory 218 during execution of software in computer platform 205. For example, a memory management unit (MMU) 215 may facilitate DMA exchanges between memory 218 and a peripheral (not shown). Alternatively, memory 218 may be directly coupled to bus 225—e.g. where MMU 215 is integrated into the uncore of processor 210—although various embodiments are not limited in this regard. It is appreciated that software and/or data may reside in storage 240, memory 218, non-volatile storage 220 or may be transmitted or received via modem or network interface 245.

Figure 3:
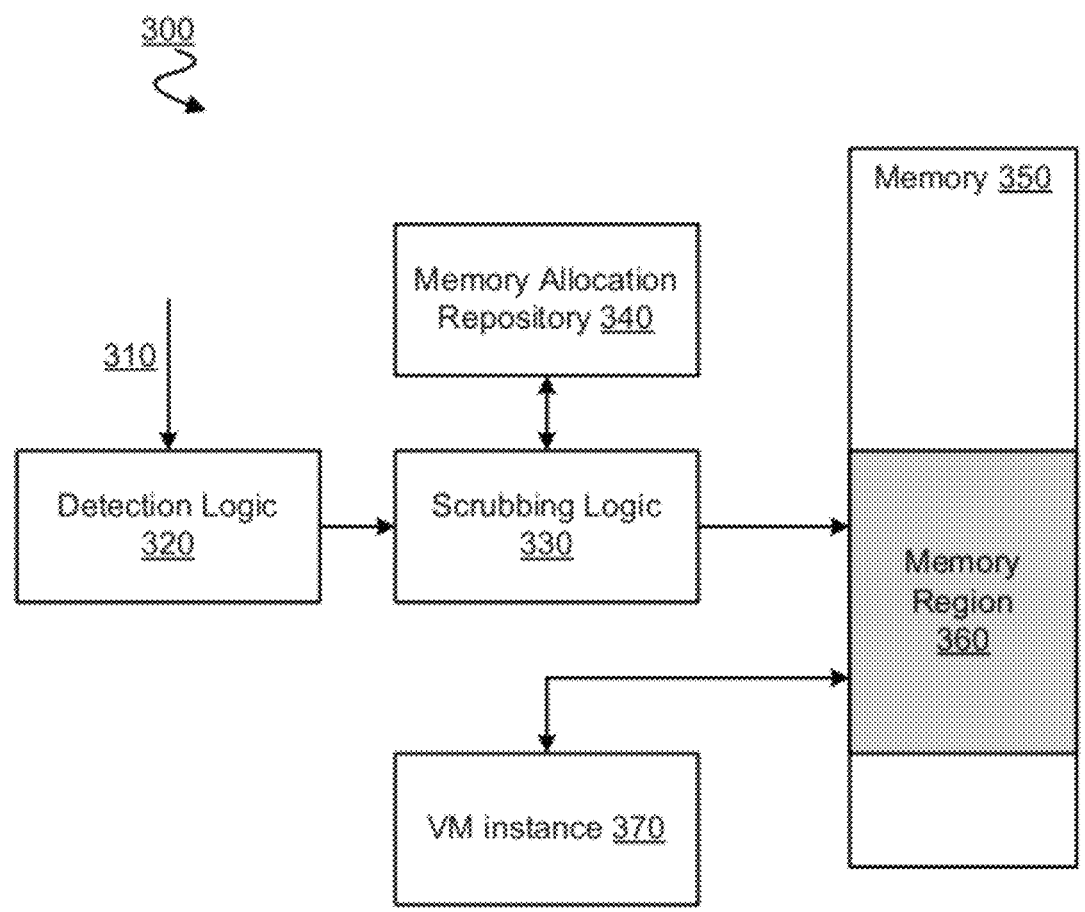
FIG. 3 is a block diagram illustrating select elements of a computer platform to write over virtualization information according to an embodiment.

FIG. 3 illustrates select elements of a computer platform 300 according to an embodiment for limiting access to virtualization information for a process of a VM instance. Computer platform 300 may include some or all of the features of computer platform 205, for example.

In an embodiment, computer platform 300 includes a memory 350 having a memory region 360—e.g. including contiguous and/or non-contiguous memory locations, such as memory lines and/or memory pages, etc.—which is allocated, at some point in time, for use by a VM instance 370 residing on computer platform 300. The allocation of memory region 360 to VM instance 370 may be defined or otherwise described in a memory allocation repository 340 of computer platform 300. Memory allocation repository 340 may reside, for example, in another region of system memory 350, in a processor (not shown) of platform 300 having features such as those of processor 210, or in any of a variety of chipset components (not shown) which are capable of supporting memory management functionality for managing access to memory 350.

According to an embodiment, detection logic 310 of computer platform 300 may receive or otherwise detect a signal 310 indicating a close event—e.g. where the close event is at least part of ending the VM instance on computer platform 300. Detection logic 320 may reside within a processor such as processor 210, for example. Alternatively, detection logic 320 may reside within a component of a chipset which supports management of access to memory 350.

By way of illustration and not limitation, signal 310 may be a command, request or other communication specifying or otherwise indicating that configuration information in memory allocation repository 340 is to be updated. For example, signal 310 may indicate that configuration information describing an allocation of memory region 360 is to be updated to reflect that memory region 360 is no longer allocated to VM instance 370. Such reallocation may, for example, be to release all memory allocated to VM instance 370—e.g. for an ending of VM instance 370 on computer platform 300. Alternatively, such reallocation may be to release only a portion of memory allocated to VM instance 370—e.g. for re-allocation to some other VM. Although shown as being included in computer platform 300, it is understood that at the time of detection logic 320 detecting signal 310, processes of VM instance 370 may have already stopped executing on computer platform 300.

The detected signal 310 may be generated by, or in response to, any of a variety of agents of computer platform 300 or any of a variety of agents external to computer platform 300. By way of illustration and not limitation, signal 310 may be detected by detection logic 320 in response to VM instance 370 itself requesting that it be ended on computer platform 300. VM instance 370 may issue such a request, for example, in response to detecting that a task of VM instance 370 has been completed and/or in response to some error, interrupt, break or other similar event having occurred during execution of VM instance 370. Alternatively or in addition, signal 310 may be detected in response to a VMM (not shown) having detected such tasks and/or events of VM instance 370. Alternatively or in addition, signal 310 may be detected, for example, in response to an indication of a need to shut down, suspend, reboot, etc. the computer platform 300. For example, signal 310 may be generated by a host OS, security processor, power management hardware or other logic capable of initiating shut down, suspend, reboot, etc. changes to a platform.

In an embodiment, detection logic 320 may determine from signal 310 a need to protect from potentially improper access to virtualization information after the changing of the allocation of memory region 360. In response to signal 310, detection logic 320 may send a command to scrubbing logic 330 of computer platform 300 to "scrub" memory region 360—e.g. by writing over at least some virtualization information which had been stored in memory region 360 for a process of VM instance 370. Scrubbing logic 330 includes logic, responsive to the indication from detection logic 320, to write over at least some virtualization information which had been stored in memory region 360 for a process of VM instance 370. Writing over virtualization information may include, for example, erasing virtualization information and/or replacing virtualization information with some generic placeholder information.

Figure 4:
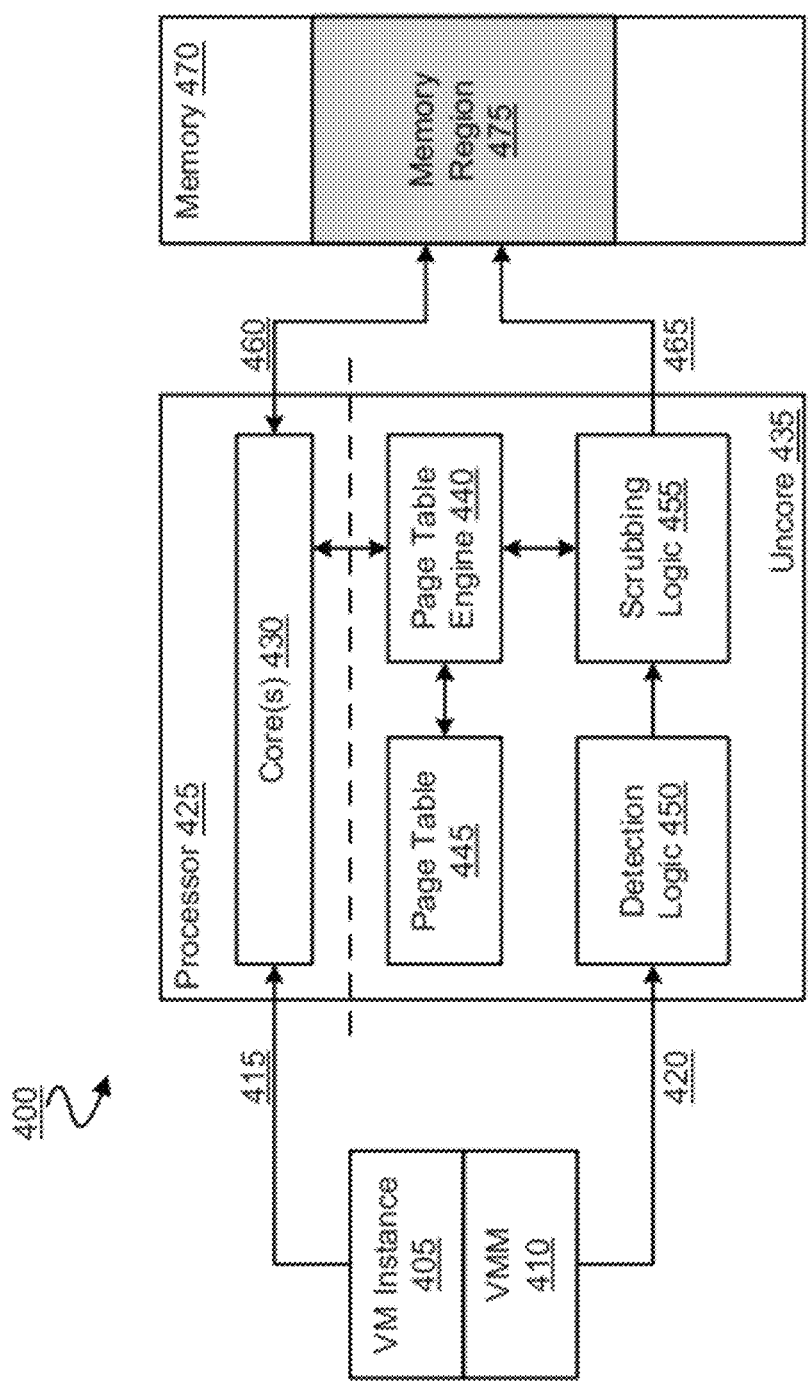
FIG. 4 is a block diagram illustrating select elements of a computer platform to write over virtualization information according to an embodiment.

FIG. 4 illustrates select elements of a computer platform 400 according to an embodiment for limiting access to virtualization information for a process of a VM instance. Computer platform 400 may include some or all of the features of computer platform 300, for example.

In an embodiment, computer platform 400 includes a processor 425 to facilitate a VM instance 405 and a VMM 410 to manage VM instance 405. Although shown separately from processor 425 in FIG. 4, it is understood that respective processes of VM instance 405 and VMM 410 may execute within one or more processor cores of processor 425—e.g. in the illustrative core(s) 430. Computer platform 400 may further include a memory 470 having a memory region 475 which is allocated, at some point in time, for use by VM instance 405. For example, processor 425 may include, or otherwise have access to, a repository—e.g. having some or all of the features of memory allocation repository 340—to store configuration information defining or otherwise describing the allocation of memory region 475 to VM instance 405. By way of illustration and not limitation, processor 425 may include a page table 445 which is accessible to core(s) 430 via a page table engine 440.

Memory region 475 may store, for example, virtualization information such as data and/or instructions for use in a process of VM instance 475. In operation, a process of VM instance 405 may result in core(s) 430 detecting a result 415 indicating that certain virtualization information is to be accessed in memory region 475. In an embodiment, signal 415 indicates to core(s) 430 a virtual address of VM instance 405, which core(s) 430 may convert to a physical address of memory region 475 by accessing page table 445 through page table engine 440. The accessing of page table 445 (or other similar memory allocation repository) may be according to established techniques, and is not limiting on certain embodiments.

In response to output 415, core(s) 430 may perform an access 460 of memory region 475—e.g. to read data from and/or write data to memory region 475. Alternatively or in addition, core(s) 430 may perform access 460 in order to retrieve from memory region 475 a next instruction to be performed for a process of VM instance 405.

At some point in time, VM instance 405 is to be ended on computer platform 400—e.g. as discussed above with reference to VM instance 370. The ending of VM instance 405 may be indicated by, or in response to, a signal 420 being detected by detection logic 450 of computer platform 400. Although shown as residing in an uncore 435 of processor 425, it is understood that detection logic 450 may reside elsewhere in computer platform 400—e.g. as discussed above with reference to detection logic 320. Moreover, although shown as being provided to detection logic 450 by VMM 410, signal 420 may additionally or alternatively be provided by any of a variety of agents internal to, or external to, computer platform 400—e.g. as discussed above with reference to signal 310.

In response to signal 420, detection logic 450 may send a command to scrubbing logic 455 of computer platform 400 to "scrub" memory region 475—e.g. by writing over at least some virtualization information which had been stored in memory region 475 for a process of VM instance 405. Although shown as residing in uncore 435, it is understood that scrubbing logic 455 may reside elsewhere in computer platform 400—e.g. as discussed above with reference to scrubbing logic 330.

The indication provided to scrubbing logic 455 from detection logic 450 may include an identifier of VM instance 405. In response to the indication provided by detection logic 450, scrubbing logic 455 may write over at least some virtualization information which had been stored in memory region 475 for a process of VM instance 405. For example, in order to write over virtualization information in memory region 475, scrubbing logic 455 may use an identifier of VM instance 405 to access page table 445 via page table engine 440. More particularly, VM instance 405 may retrieve from page table 445 information describing one or more locations in memory which are allocated to VM instance 405. Based on the information retrieved from page table 445, scrubbing logic 455 may provide a communication 465 to write over some or all virtualization information in memory region 475.

Figure 5:
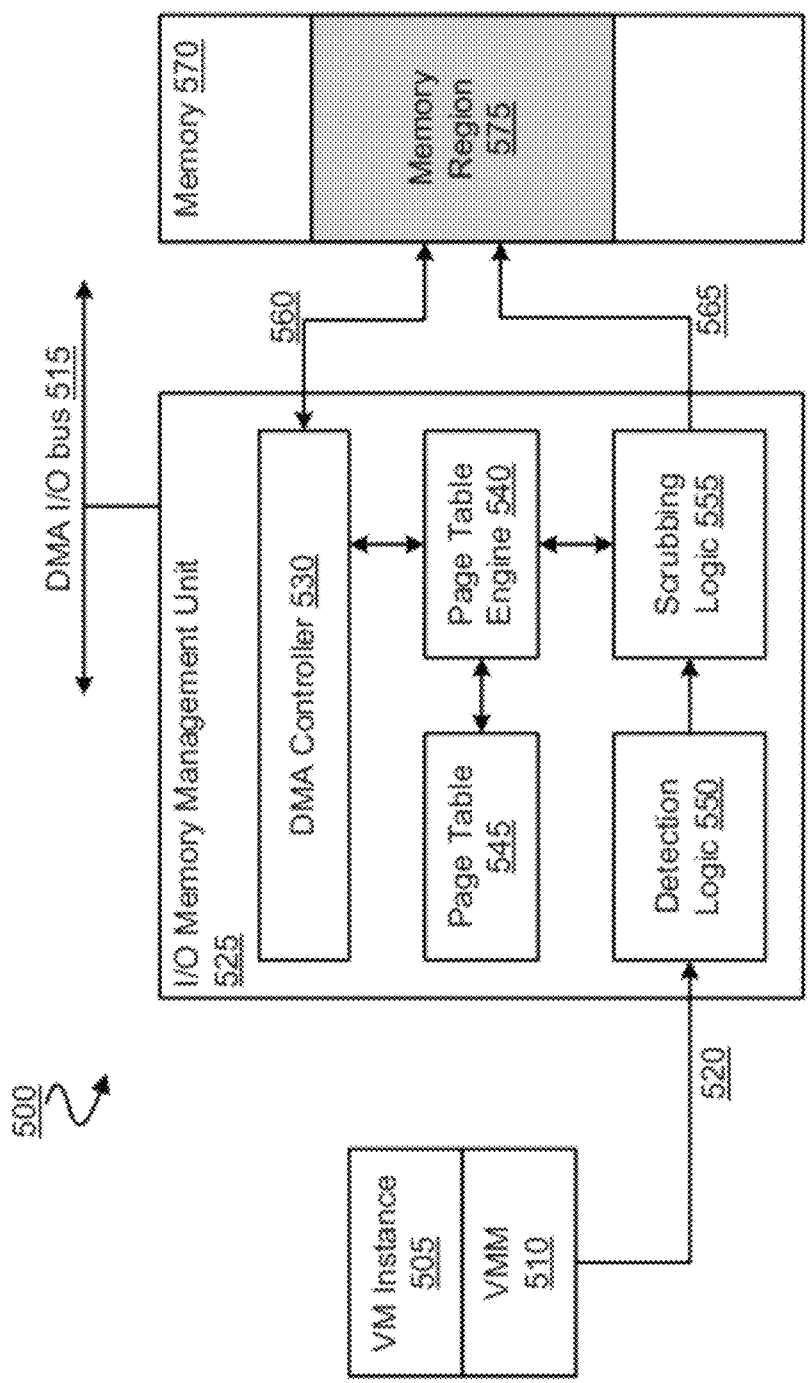
FIG. 5 is a block diagram illustrating select elements of a computer platform to write over virtualization information according to an embodiment.

FIG. 5 illustrates select elements of a computer platform 500 according to an embodiment for limiting access to virtualization information for a process of a VM instance. Computer platform 500 may include some or all of the features of computer platform 300, for example.

In an embodiment, computer platform 500 includes a VM instance 505 and a VMM 510 to manage VM instance 505. Respective processes of VM instance 505 and VMM 510 may execute within one or more processors (not shown) of computer platform 500—e.g. a processor such as processor 118. Computer platform 500 may further include a memory 570 having a memory region 575 which is allocated, at some point in time, for use by VM instance 505. By way of illustration and not limitation, computer platform 500 may include a repository—represented by an illustrative page table engine 540—to store configuration information which defines or otherwise describes an allocation of memory region 575 for use by VM instance 505. The configuration information stored in page table 545 may be accessed via a page table engine 540 of computer platform 500.

In an embodiment, computer platform 500 includes an input/output memory management unit (IOMMU) 525 to access virtualization information stored in memory region 575—e.g. stored by direct memory access (DMA). IOMMU 525 may include a DMA controller 530 (e.g. hardware, software and/or firmware logic) to control a DMA data exchange 560 between memory region 575 and a DMA compatible I/O bus 515 of computer platform 500. DMA controller 530 may implement DMA transfers to and/or from a location in memory region 575 by accessing, e.g. via page table engine 540, configuration information which is stored in page table 545. By way of illustration and not limitation, page table engine 540 may provide DMA controller 530 with an identifier of a physical address for a location in memory region 575—e.g. based on DMA controller 530 providing an identifier of a corresponding virtual address associated with VM instance 505. DMA transfer operations by DMA controller 530 may be according to established techniques, and are not limiting on certain embodiments.

At some point in time, VM instance 505 is to be ended on computer platform 500—e.g. as discussed above with reference to VM instance 370. The ending of VM instance 505 may be indicated by, or in response to, a signal 520 being detected by detection logic 550 of computer platform 500. Signal 520 may include, or otherwise be based on, a signal generated by executing software. Alternatively or in addition, signal 520 may include, or otherwise be based on, a signal generated solely by hardware. Although shown as being provided to detection logic 550 by VMM 510, signal 520 may additionally or alternatively be provided by any of a variety of agents internal to, or external to, computer platform 500—e.g. as discussed above with reference to signal 310.

In response to signal 520, detection logic 550 may send a command to scrubbing logic 555 of computer platform 500 to "scrub" memory region 575—e.g. by writing over at least some virtualization information which had been stored in memory region 575 for a process of VM instance 505. In an embodiment, the indication provided to scrubbing logic 555 from detection logic 550 may include an identifier of VM instance 505. In response to the indication provided by detection logic 550, scrubbing logic 555 may erase or otherwise remove at least some virtualization information which had been stored in memory region 575 for a process of VM instance 505. For example, in order to write over virtualization information in memory region 575, scrubbing logic 555 may use an identifier of VM instance 505 to access page table 545 via page table engine 540. More particularly, VM instance 505 may retrieve from page table 545 information describing one or more locations in memory which are allocated to VM instance 505. Based on the information retrieved from page table 545, scrubbing logic 555 may provide a communication 565 to write over some or all virtualization information in memory region 575.

Although shown as residing in IOMMU 525, it is understood that some or all of page table 545, page table engine 540, detection logic 550 and scrubbing logic 555 may be variously located in one or more other components of computer platform 500, where such components are directly or indirectly coupled to IOMMU 525 for performing the techniques described.

Figure 6:
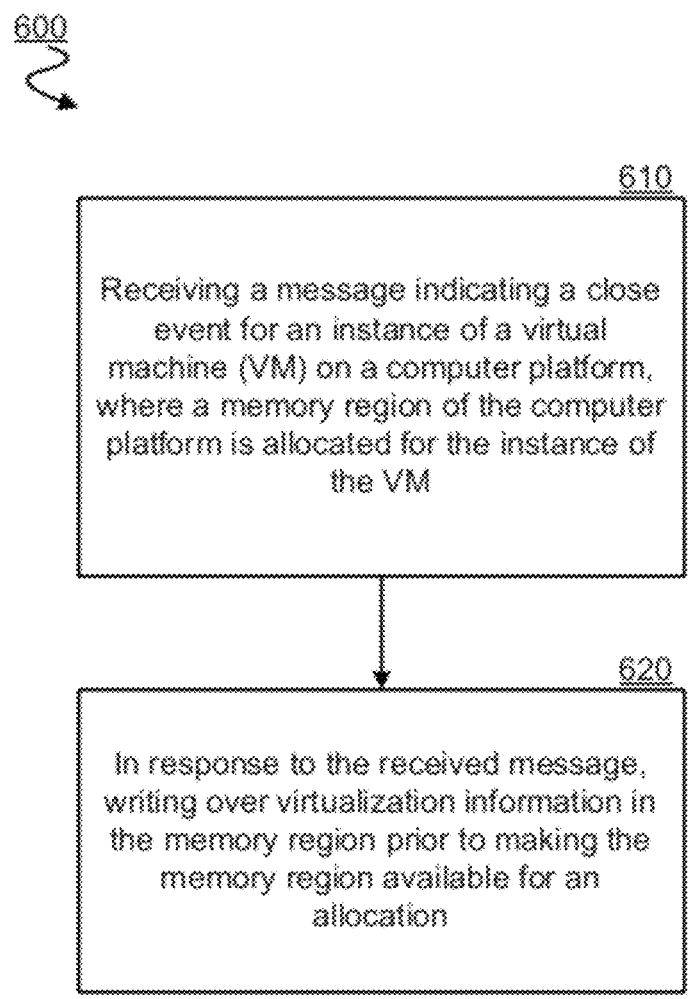
FIG. 6 is a flow diagram illustrating select elements of an algorithm to provide virtualization security mechanisms according to an embodiment.

FIG. 6 show select elements of an illustrative method 600 for limiting access to virtualization information according to an embodiment. Method 600 may, for example, be performed by logic including some or all of the features of detection logic 320 and scrubbing logic 330. In an embodiment, method 600 may include, at 610, receiving a message indicating a close event for a VM instance on a computer platform. A region of system memory in the computer platform may be allocated for the VM instance.

Allocation of the memory region to the VM instance may be defined, or otherwise described, by configuration information which is stored in a memory allocation repository. The memory allocation repository may be accessible, directly or indirectly, to an agent for use in transfers of information to and/or from the memory region. By way of illustration and not limitation, a memory allocation repository may be accessible to one or more processor cores and/or an IOMMU, as discussed herein. As variously discussed herein, the region of memory may store virtualization information—e.g. data and/ or instructions—to be used in executing an operation of the VM instance.

In an embodiment, the received message indicating the close event may be independent of any specific software request—e.g. a VM or VMM software request—to write over virtualization information. For example, the received signal may be generated by, or in response to, an executing process of the VM instance, a VMM managing the VM instance, a host OS, a BIOS, etc.—i.e. without the executing process specifying that any virtualization information is to be written over in the memory region.

In response to the received signal, method 600 may, at 620, write over some or all virtualization information which is stored in the memory region. The virtualization information may be written over prior to the memory region being made available for another allocation. By way of illustration and not limitation, the virtualization data may be written over prior to some updating of the configuration information to indicate that the memory region is no longer allocated to the VM instance. Alternatively or in addition, the virtualization data may be written over prior to some confirmation message being sent to an allocating agent, the confirmation message indicating that the configuration information has been updated to indicate that the memory region is no longer allocated to the VM instance.

Techniques and architectures for providing computer security mechanisms are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions—e.g. where the storage media is to be coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   detection logic including circuitry configured to receive a message indicating a close event of an instance of a virtual machine (VM) on a computer platform, where a memory region of the computer platform is allocated for the instance of the VM; and
   scrubbing logic coupled to the detection logic, the scrubbing logic configured to access configuration information of a memory allocation repository to identify a location of the memory region, scrubbing logic further to write over virtualization information in the memory region prior to making the memory region available for an allocation, wherein the virtualization information is written over responsive to the received message and based on the accessed configuration information of the memory allocation repository.

2. The apparatus of claim 1, wherein the scrubbing logic writes over the virtualization information independent of any request specifying that information in the memory region be written over.

3. The apparatus of claim 2, wherein the scrubbing logic writes over the virtualization information independent of any software request from a VM or from a VM monitor specifying that information in the memory region be written over.

4. The apparatus of claim 1, wherein the message includes one of a request to terminate the VM and a request to migrate the VM to another computer platform.

5. The apparatus of claim 1, wherein the virtualization information includes one or more of data describing a state of the VM and an instruction to be executed for an operation of the VM on the computer platform.

6. The apparatus of claim 1, wherein the apparatus includes a processor comprising at least one of the detection logic and the scrubbing logic.

7. The apparatus of claim 1, wherein the apparatus includes a memory management unit comprising at least one of the detection logic and the scrubbing logic.

8. The apparatus of claim 7, wherein the memory management unit includes an input/output (I/O) memory management unit for performing direct memory access (DMA) operations.

9. The apparatus of claim 1, wherein the allocation repository includes information to associate a virtual address to a physical address.

10. A method comprising:
    receiving a message indicating a close event of an instance of a virtual machine (VM) on a computer platform, where a memory region of the computer platform is allocated for the instance of the VM;
    accessing a memory allocation repository to identify a location of the memory region; and
    in response to the received message, writing over data from the memory region prior to making the memory region available for an allocation, wherein the writing over the data is based on the accessing the memory allocation repository.

11. The method of claim 10, wherein writing over the data comprises writing over virtualization information independent of any request specifying that information in the memory region be written over.

12. The method of claim 11, wherein writing over the virtualization information is performed independent of any software request from a VM or from a VM monitor specifying that information in the memory region be written over.

13. The method of claim 10, wherein the data from the memory region includes one or more of data describing a state of the VM and an instruction to be executed for an operation of the VM on the computer platform.

14. The method of claim 10, wherein the memory allocation repository includes configuration information to associate a virtual address to a physical address.

15. A system comprising:
    a dynamic random access memory (DRAM);
    detection logic to receive a message indicating a close event of an instance of a virtual machine (VM) on the system, where a memory region of the DRAM is allocated for the instance of the VM; and
    scrubbing logic coupled to the detection logic, the scrubbing logic configured to access configuration information of a memory allocation repository to identify a location of the memory region, scrubbing logic further to write over virtualization information in the memory region prior to making the memory region available for an allocation, wherein the virtualization information is written over responsive to the received message and based on the accessed configuration information of the memory allocation repository.

16. The system of claim 15, wherein the scrubbing logic writes over the virtualization information independent of any request specifying that information in the memory region be written over.

17. The system of claim 16, wherein the scrubbing logic writes over the virtualization information independent of any software request from a VM or from a VM monitor specifying that information in the memory region be written over.

18. The system of claim 15, wherein the message includes one of a request to terminate the VM and a request to migrate the VM to another system.

* * * * *